United States Patent [19]
Krupnicki

[11] Patent Number: 5,378,870
[45] Date of Patent: Jan. 3, 1995

[54] POWER BLOCK FOR LIQUID-COOLED POWER CABLES

[76] Inventor: Theodore A. Krupnicki, 565 Adams Rd., Webster, N.Y. 14580

[21] Appl. No.: 970,848

[22] Filed: Nov. 3, 1992

[51] Int. Cl.$^6$ ............................................. B23K 9/32
[52] U.S. Cl. .............................. 219/137.63; 219/136; 439/194
[58] Field of Search ............. 219/136, 137.62, 137.63; 439/194, 196; 174/15.6, 15.7

[56] References Cited

U.S. PATENT DOCUMENTS

| | | | |
|---|---|---|---|
| 1,548,204 | 8/1925 | Moesta | 439/196 |
| 1,674,829 | 6/1928 | Bean | 439/196 |
| 1,884,570 | 10/1932 | Chapman | 219/137.62 |
| 3,065,438 | 11/1962 | Anderson | 439/196 |
| 3,346,832 | 10/1967 | Wallace | 439/196 |
| 4,942,281 | 7/1990 | Srba | 219/136 |
| 4,963,694 | 10/1990 | Alexion et al. | 174/15.6 |

*Primary Examiner*—Clifford C. Shaw
*Attorney, Agent, or Firm*—Warren W. Kurz

[57] ABSTRACT

A power block adapted to couple a water-cooled power cable of a welding torch or the like to a power source and a water conduit. The power block comprises an electrically conductive housing which defines an aperture for receiving a post of a power supply, and a pair of angularly disposed cylindrical ports for receiving and retaining a water conduit and a water-cooled power cable. By virtue of the angular relationship between such ports, there is minimal stress on the water-containing sleeves of the water conduit and power cable, and lower torque about the power post tending to loosen the power block from engagement with the post. Preferably, the power block housing defines a third port having a quick-connect/disconnect feature for receiving and retaining a second power cable.

12 Claims, 3 Drawing Sheets

POWER BLOCK FOR LIQUID-COOLED POWER CABLES

BACKGROUND OF THE INVENTION

The present invention relates to improvements in so-called "power-blocks" of the type used to connect a water-cooled power cable to both an electrode of a power source and a water supply/disposal conduit.

In various electrical systems in which relatively high currents (e.g. several hundred amperes or more) are applied to a load, it is known to cool the current-carrying cable with a liquid coolant in order to, increase the cable's current-carrying capacity. Typical of such electrical systems is a TIG arc welding system in which a high current is supplied to a non-consumable (.e.g. tungsten) electrode of a welding torch through a water-cooled power cable. Such cables commonly comprise a braided wire conductor which is loosely surrounded, along its entire length, by a flexible sleeve of dielectric material (e.g. plastic or rubber) through which water (or some other liquid coolant) is caused to flow.

In water-cooled welding systems, one end of the welding torch's power cable is connected to the welding machine's power supply via a "power block", sometimes known as a "power cable adapter". The power block provides a dual function of coupling the power cable to the welding machine's power supply, and of coupling the power cable to a liquid coolant supply, or to a coolant disposal or recirculation system. For maximum cooling efficiency, the coolant is usually supplied to the power cable through a connector in the welding torch, the water being supplied directly to the torch through a separate coolant line. In this configuration, the coolant returns to the welding machine through the power cable for disposal or recirculation. Of course, the reverse configuration is possible in which the coolant is supplied through the power block of the welding machine and, upon passing through the torch, the coolant is dispensed or recirculated through a separate line.

Referring to FIGS. 1–3, a conventional power block of the type mentioned above typically comprises a rectangularly-shaped housing 10 having an upwardly extending integral flange 12. The housing and its flange are made of solid brass or some other metal of high electrical conductivity. A circular aperture 16 is formed in the integral flange so that the power block can be supported by a threaded metal post 18 which typically extends horizontally from the control panel of the welding machine, such post constituting the high voltage electrode of the machines internal power supply P. As best shown in FIG. 2, a pair of threaded cylindrical ports 20,22 are formed in the opposing ends of the power block's housing, such ports being in fluid communication with each other by a narrow passageway 24. Port 20 is often smaller in diameter than port 22 and is adapted to receive the threaded nipple 26 comprising the connector 28 of a water conduit 30. Similarly, port 22 is adapted to receive the threaded nipple 32 comprising the connector 34 of a water-cooled power cable 36 which, as shown, is usually somewhat thicker than the water conduit 30. As noted above, power cable 36 may comprise a heavy-duty braided wire conductor 38 which is loosely surrounded by a flexible plastic sleeve 40 so that a liquid coolant (usually water) can flow along the length of the conductor. Thus, as indicated by the arrows in FIG. 1, the water coolant flows on a straight line directly through the power block. Power blocks of the type shown in FIGS. 1–3 are disclosed, for example, in U.S. Pat. No. 4,942,281, issued to C.F Srba.

In using power blocks of the above type, it will be seen from FIG. 2 that the water conduit 30 and power cable 36 extend horizontally outwardly., in opposite directions, from the respective ends of the power block. Owing to the respective weights of the water conduit and cable, there is tendency for creases C to form in the flexible water-containing sleeves of these elements, usually in the vicinity where the sleeve looses contact with a sleeve-supporting tubular fitting 41, 42, comprising the connectors 28 and 34, respectively. Through continued movement of the conduit and cable, as occurs during the welding operation, such creases can eventually give rise to coolant leaks, requiring repair or replacement of the coolant conduit and power cable.

While some welding machines are especially adapted for TIG and MIG welding, such systems are sometimes operated in a so-called "stick" welding mode to supply current to a consumable "stick" electrode. To operate in a stick welding mode, it is necessary to connect the welding machine's power post 18 (FIG. 3) to a relatively heavy-duty (uncooled) power cable. The latter is used to couple electrical energy between the welding machine's power supply and a stick electrode holder. Rather than removing the power block and connecting the stick power cable directly to the power post, the welder will more often simply loosen the nut N that holds the power block in place on the power post 18 and connect the stick electrode power cable to the post through a standard U-shaped cable lug. The nut is then retightened to hold both the power block and stick electrode cable lug in place. Thus, the power source can now be used for different types of welding operations, depending on which power cable is used and the power source settings. But there are at least two problems with this type of arrangement. First, when a conventional power block is supported by the machines power post, there is usually no room to accommodate the additional stick welding cable. It is not only difficult to make a good electrical connection between the stick power cable and the power block, but also the stick power cable will be directed upwardly, usually at some inconvenient angle, which enables slight movements of the stick power cable to loosen the retaining nut and thereby disrupt power to the stick electrode. Secondly, whenever both the water-cooled and stick power cables are connected to the power source, the available power supplied to the TIG/MIG torch is compromised. Often, rather than disconnecting the stick power cable prior a TIG welding operation, a welder will simply coil-up the stick power cable and hang it somewhere on the machine. This can be problematic because, should the welding machine be operated in an AC mode (e.g. for non-ferrous metal welding), the coiled stick cable can have the effect of decreasing the available amperage to the torch, as well as reducing the high-frequency component required to establish a welding arc without physically touching the tungsten electrode to the workpiece.

SUMMARY OF THE INVENTION

In view of the foregoing, an object of this invention is to provide an improved power block of the above type, one that is less apt to become loose on its supporting power post, and one that is less apt to cause damage to the connecting power cable and water conduit.

Another object of this invention is to provide a power block of the above type which further includes a quick-connect receptacle for an un-cooled power cable, whereby a welder can maintain a TIG/MIG torch permanently attached to a welding machine while quickly coupling and de-coupling a stick power cable.

Like the prior art, the power block of the invention comprises an electrically conductive housing which defines an aperture for receiving a power post of a power supply and a pair of fluid-communicating cylindrical ports for receiving and retaining the respective connectors of a water conduit and a water-cooled power cable. Unlike the prior devices, however, the cylindrical ports of the power block of the invention are angularly disposed with respect to each other, the respective axes of the ports forming an angle between about 30 degrees and 150 degrees. By this geometry, the power cable and water conduit connected to a supported power block are directed downwardly, rather than directly outwardly, i.e., horizontally, as in the case of the prior art devices. By virtue of the angular relationship between such pores, as described in detail below, there is minimal stress imposed on the water-containing sleeves of the water conduit and power cable. Also preferred is that the ports extend outwardly at an acute angle relative to the plane of the flange portion, whereby the connected cable and conduit are easily grasped and do not interfere with features of a control panel or the like on which the power block is mounted. Also preferred is that the power block housing defines a third port positioned approximately midway between the aforementioned two ports, such third port being provided with a "quick-connect" feature, whereby a conventional stick power cable can be selectively received and retained.

Other objects and advantages of the invention will be apparent to those skilled in the art from the ensuing detailed description of preferred embodiments, reference being made to the accompanying drawings wherein like reference characters denote like parts.

DETAILED DESCRIPTION OF PREFERRED EMBODIMENTS

Figure 1:
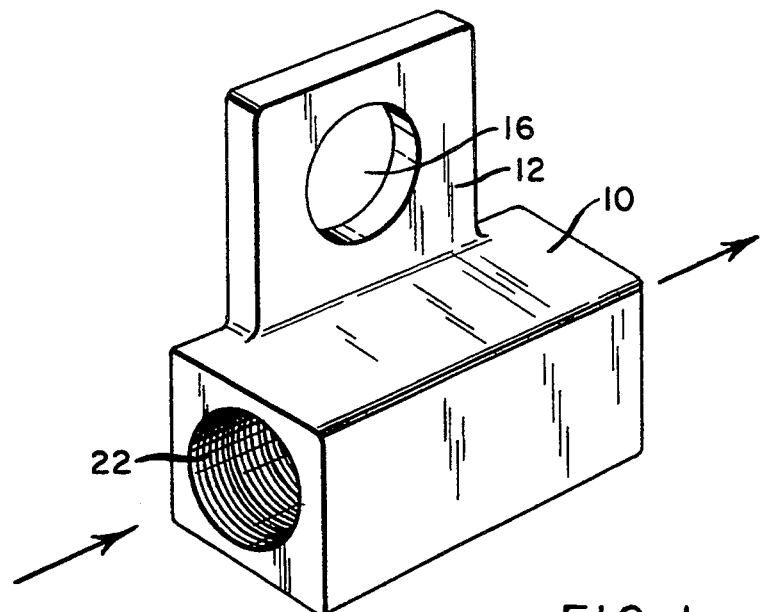
FIG. 1 is a perspective illustration of a conventional power block of the type described above.
Figure 3:
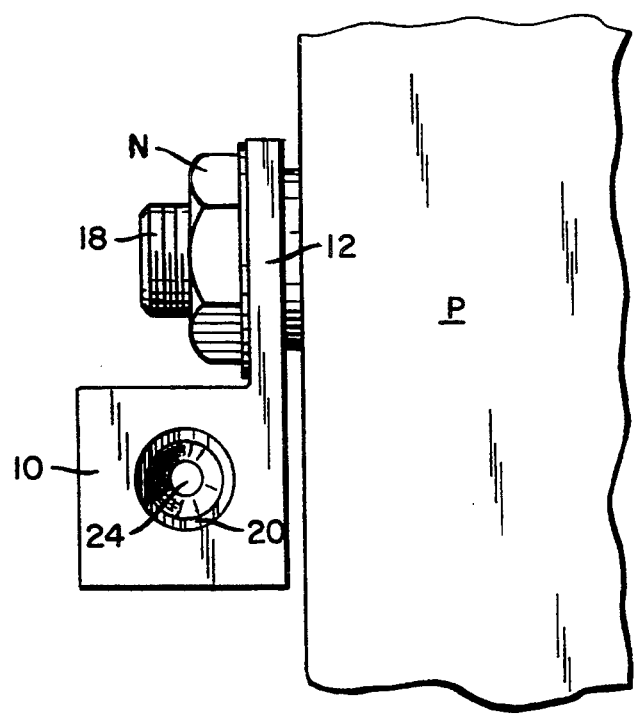
FIG. 3 is a right side elevational view of the FIG. 1 power block showing the block as being supported by the power electrode of a power supply.
Figure 2:
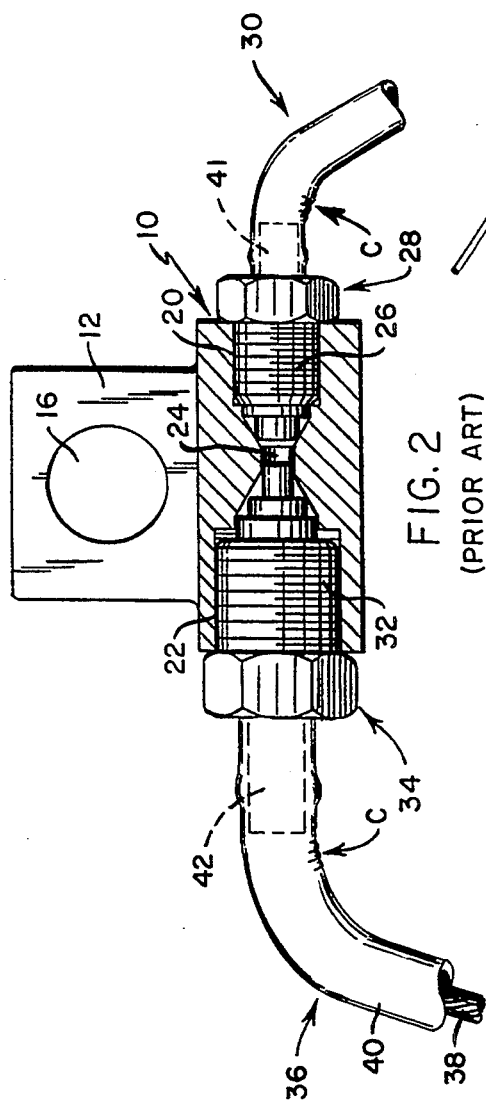
FIG. 2 is a front elevational illustration of the FIG. 1 power block with a power cable and water conduit connected thereto.
Figure 4:
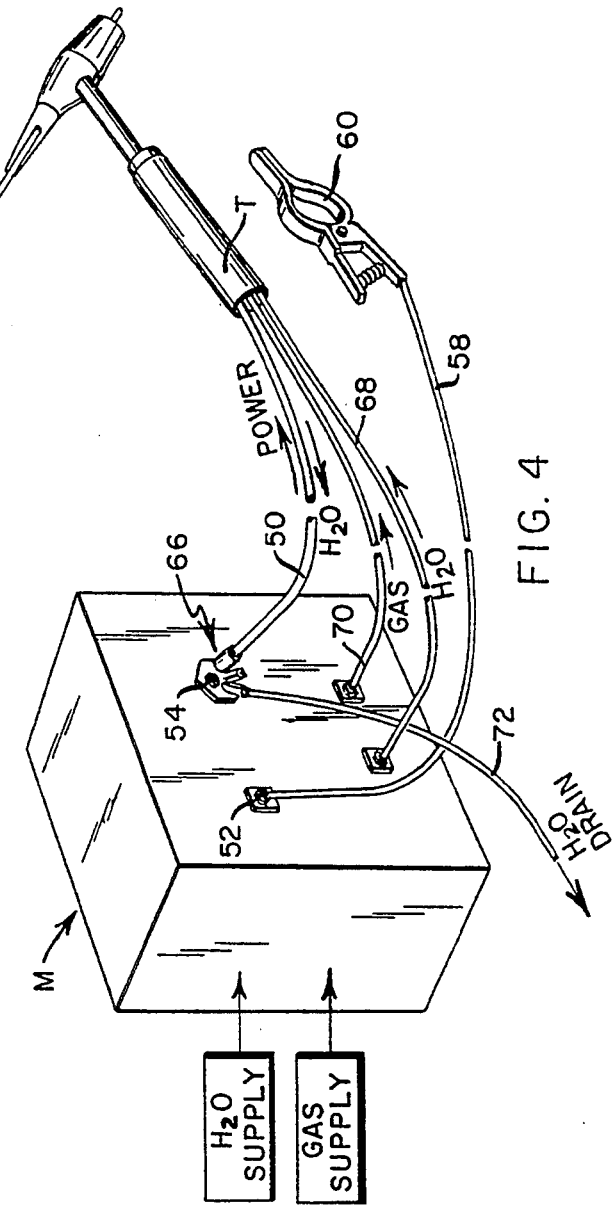
FIG. 4 is a schematic illustration of a welding system in which the power block of the invention is particularly useful.

Referring now to FIG. 3, a conventional water-cooled TIG (tungsten-inert gas) arc welding system is schematically illustrated as comprising a welding torch T which is connected to a welding machine M by a water-cooled power cable 50. The welding machine Contains a variable current (e.g., 5–500 amps.) power supply having ground and high current electrodes 52,54, respectively, extending outwardly through the front control panel of the machine. As is known in the art, electrodes 52 and 54 are in the form of threaded posts, typically ¼ to 5/8 inch in diameter. Ground electrode 52 is connected via a ground cable 58 to a grounding clamp 60 which, in turn, is connected to the workpiece during the welding operation. High current electrode 54 is connected to the power cable via a power block 66, described below and constituting the subject matter of this invention. Water and inert gas are supplied to the machine by separate supplies, and conduits 68 and 70 connect the torch to such supplies via the machine, as shown.

Figure 5:
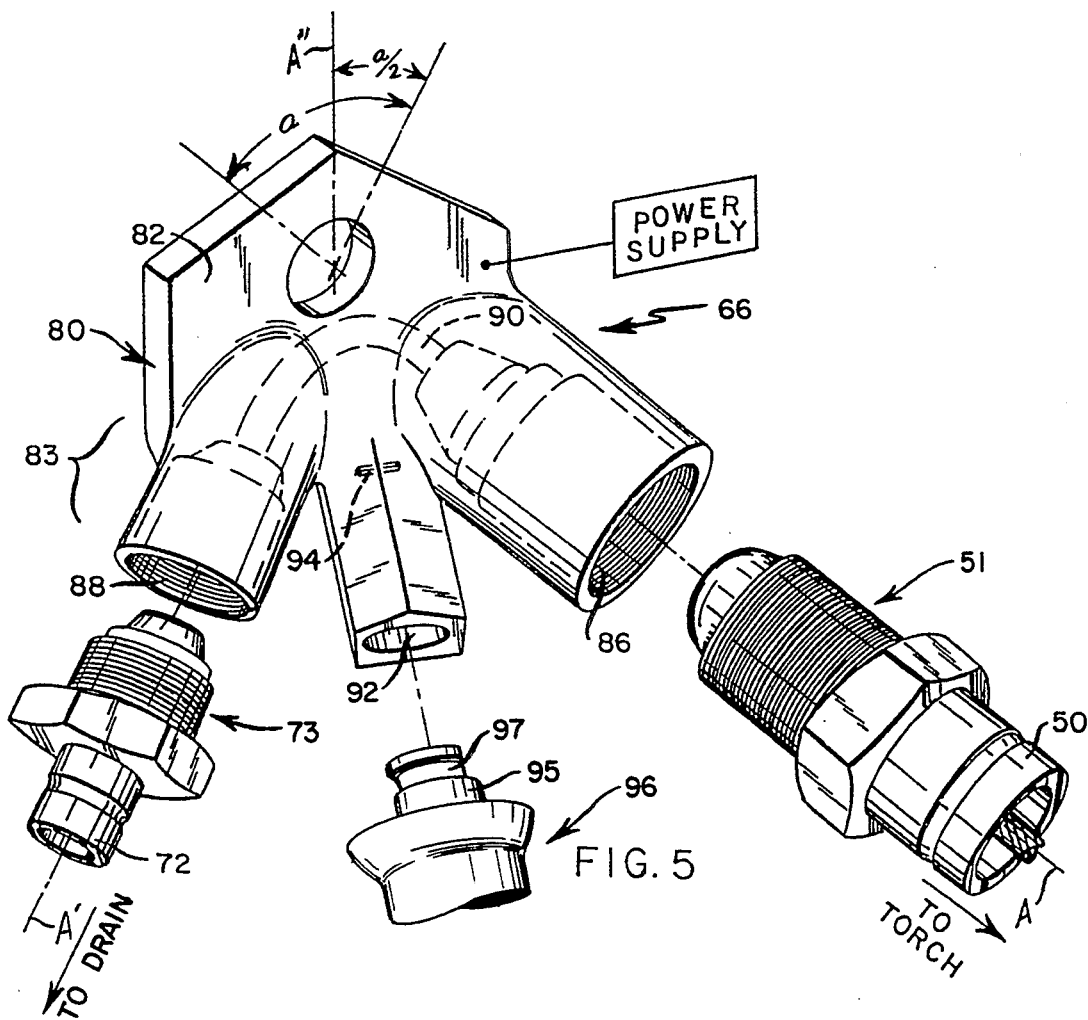
FIGS. 5 and 6 are front and side elevations of a preferred embodiment of the invention.
Figure 6:
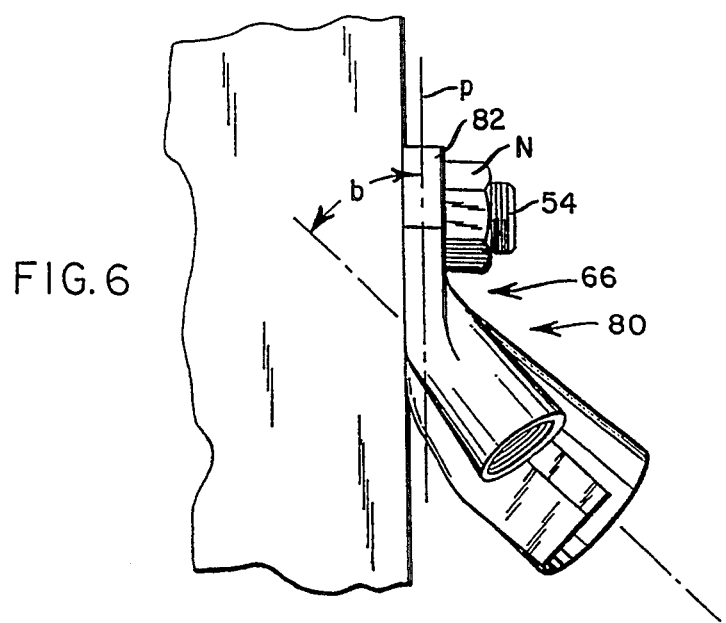

Referring now to FIGS. 5 and 6, power block 66 preferably comprises a solid metal housing 80 which is shaped to define a planar flange portion 82 and a multi-port portion 83. Preferably, housing 80 is made of brass or copper. Flange portion 82 has an aperture 84 formed therein by which the power block is mountable on the high current post 54 of the welding machine. Multiport portion 83 defines at least two cylindrical ports 86 and 88 which are suitably threaded to receive the threaded nipples of a water-cooled power cable connector 51 and a water conduit connector 73. A narrow passageway 90, internal to the power block housing, allows water to flow between ports 86 and 88. Optionally, but highly preferred, the multiport portion defines an unthreaded third port 92 for receiving and retaining, via a so-called "quick-connect" feature (e.g. a small projection 94 on the interior surface of the port), the connector 95 of an uncooled power cable of the type used in "stick" welding to connect a welding stick electrode to the welding machine. Such a connector is commonly connected to the power block by simply inserting the barrel portion 96 of the connector into the port and twisting the connector to set the projection 94 within a groove 97 formed in the end of barrel portion 96. As shown, groove 97 does not fully extend about the periphery of a portion of the barrel portion, thereby allowing the barrel portion to be inserted into port 92 until the groove aligns with the projection. Upon twisting the barrel portion, projection 94 enters the groove 97 and prevents the barrel portion from being pulled straight out of the port 92.

In the power block of FIGS. 5 and 6, it is particularly important to note the angular relationship of the ports, particularly ports 86 and 88, not only with respect to each other, but also with respect to the plane p of the flange portion. As shown, the axis A of port 86 is angularly disposed with respect to the axis A' of port 88 by an angle a. In contrast with the prior art where these axes are aligned (i.e. angle a=180 degrees), angle a in the power block of the invention is between about 30 degrees and about 150 degrees, and more preferably between 30 and 90 degrees. As a result of this angular relationship, cable 50 and conduit 72 are directed generally downwardly, thereby reducing the stress on the cable and conduit. Also, by arranging the ports so that their respective axes pass approximately through the axis of aperture 84, any torque on the power block resulting from cable movement is reduced, thereby reducing the tendency of the power block to become loose on the supporting power post.

Preferably, the axis A" of port 92 forms an angle a/2 with respect to axes A and A'. Also, it is highly preferred that the respective axes of ports 86, 88 and 92 extend angularly outwardly from the plane p of flange portion 82 at an angle b. Preferably, angle b is between about 10 degrees and about 45 degrees, whereby the connected cables and conduit are directed outwardly from the features of the control panel of the welding machine, avoiding interference therewith.

The invention has been described with particular reference to preferred embodiments. It will be appreciated, however, that numerous modifications and variations can be made without departing from the true spirit of the invention. Such modifications and variations are intended to fall within the scope of the appended claims.

What is claimed is:

1. A power block for coupling a fluid-cooled power cable to (a) a source of electrical energy and (b) a fluid conduit, said power block comprising:

an electrically conductive housing comprising (a) a first portion adapted to receive an electrically-conductive post to which one terminal of a power supply is connectable, said first portion having a planar surface, and (b) a second portion defining first and second cylindrical ports for respectively receiving and securing a fluid conduit and a fluid-cooled power cable, said cylindrical ports having respective longitudinal axes which are angularly disposed with respect to each other and with respect to said planar surface so that said cylindrical ports project forwardly, with respect to said planar surface, in directions which differ by an angle between 30 and 120 degrees, each of said longitudinal axes forming an acute angle with said planar surface.

2. The power block as defined by claim 1 wherein said first portion defines a planar flange having a circular aperture therein for receiving said electrically-conductive post, and wherein said ports extend forwardly from said planar flange at an angle between 10 and 60 degrees.

3. The power block as defined by claim 2 wherein said longitudinal axes intersect along a first line substantially coincident with a second line passing through the center of said aperture and extending in a direction normal to said planar surface.

4. The power block as defined by claim 1 wherein said housing further comprises means defining a third cylindrical port adapted to receive and retain an electrically conductive cable, said third cylindrical port extending forwardly of said planar surface at an acute angle and having an axis which is angularly disposed with respect to both of the longitudinal axes of said first and second cylindrical ports and substantially intersects said second line.

5. The power block as defined by claim 4 wherein the respective angles between the axis of said third port and the axes of said first and second ports are approximately equal.

6. A power block for use in a welding system for coupling a fluid-cooled power cable to a source of electrical energy and a fluid conduit, said power block comprising:

an electrically conductive housing comprising (a) a planar flanged portion in which an aperture is formed, said aperture being adapted to receive an electrically-conductive post to which one terminal of a power supply is connectable, and (b) means defining first, second and third cylindrical ports adapted to respectively receive and secure a fluid conduit, a fluid-cooled power cable, and an non-cooled power cable.

7. The power block as defined by claim 6 wherein all of said cylindrical ports extend outwardly from the plane of said planar flanged portion at angles between 10 and 60 degrees, and wherein the respective longitudinal axes of said ports diverge at angles between about 30 and about 150 degrees.

8. The power block as defined by claim 7 wherein at least two of said ports are threaded.

9. The power block as defined by claim 7 wherein said housing is made of brass.

10. The power block as defined by claim 7 wherein said axes intersect along a first line substantially coincident with a second line passing through the center of said aperture and extending in a direction normal to said plane.

11. The power block as defined by claim 7 wherein the respective angles between the axis of said third port and the axes of said first and second ports are approximately equal.

12. The power block as defined by claim 6 wherein said third port comprises means defining a quick connect feature for retaining said non-cooled power cable.

* * * * *